US011560308B2

(12) United States Patent
Chaubet et al.

(10) Patent No.: US 11,560,308 B2
(45) Date of Patent: *Jan. 24, 2023

(54) METHOD AND PLANT FOR GENERATION OF SYNTHESIS GAS

(71) Applicant: L'Air Liquide, Societe Anonyme pour l'Etude et l'Exploitation des Procedes Georges Claude, Paris (FR)

(72) Inventors: Lucie Chaubet, Frankfurt am Main (DE); Frederic Bonne, Paris (FR); Camille Bouet, Eaunes (FR); Holger Schlichting, Hofheim (DE); Marc Wagner, Saint Maur des Fosses (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 662 days.

This patent is subject to a terminal disclaimer.

(21) Appl. No.: 16/467,605

(22) PCT Filed: Nov. 20, 2017

(86) PCT No.: PCT/EP2017/025339
§ 371 (c)(1),
(2) Date: Jun. 7, 2019

(87) PCT Pub. No.: WO2018/103890
PCT Pub. Date: Jun. 14, 2018

(65) Prior Publication Data
US 2019/0308877 A1 Oct. 10, 2019

(30) Foreign Application Priority Data
Dec. 9, 2016 (EP) .................................... 16400058

(51) Int. Cl.
*C01B 3/52* (2006.01)
*B01D 53/14* (2006.01)
(Continued)

(52) U.S. Cl.
CPC ............ *C01B 3/52* (2013.01); *B01D 53/1462* (2013.01); *C01B 3/34* (2013.01); *C01B 3/382* (2013.01);
(Continued)

(58) Field of Classification Search
CPC ......... C01B 3/52; C01B 3/24; B01D 53/1462; C10J 3/82; C10K 1/004; C10K 1/005; F25J 3/0257
(Continued)

(56) References Cited

U.S. PATENT DOCUMENTS

2010/0018216 A1    1/2010    Fassbender

FOREIGN PATENT DOCUMENTS

DE    10 2005 046790    4/2007
EP    0 556 691    8/1993
(Continued)

OTHER PUBLICATIONS

International Search Report and Written Report for PCT/EP2017/025339, dated Feb. 19, 2018.

*Primary Examiner* — Douglas B Call
(74) *Attorney, Agent, or Firm* — Justin K. Murray

(57) ABSTRACT

Method and plant for generating a synthesis gas which consists mainly of carbon monoxide and hydrogen and has been freed of acid gases, proceeding from a hydrocarbonaceous fuel, and air and steam, wherein low-temperature fractionation separates air into an oxygen stream, a tail gas stream and a nitrogen stream, wherein the tail gas stream and the nitrogen stream are at ambient temperature and the nitrogen stream is at elevated pressure, wherein the hydro-
(Continued)

carbonaceous fuel, having been mixed with the oxygen stream and steam at elevated temperature and elevated pressure, is converted to a synthesis gas by a method known to those skilled in the art, and wherein acid gas is subsequently separated therefrom by low-temperature absorption in an absorption column, wherein the nitrogen stream generated in the fractionation of air is passed through and simultaneously cooled in an expansion turbine and then used to cool either the absorbent or the coolant circulating in the coolant circuit of the compression refrigeration plant.

4 Claims, 4 Drawing Sheets

(51) Int. Cl.
    *C01B 3/34* (2006.01)
    *C10J 3/82* (2006.01)
    *C10K 1/00* (2006.01)
    *F25J 3/02* (2006.01)
    *C01B 3/38* (2006.01)
    *C01B 3/50* (2006.01)
    *F25J 3/04* (2006.01)
    *B01D 53/00* (2006.01)

(52) U.S. Cl.
    CPC ............... *C01B 3/506* (2013.01); *C10J 3/82* (2013.01); *C10K 1/004* (2013.01); *C10K 1/005* (2013.01); *F25J 3/0257* (2013.01); *F25J 3/04545* (2013.01); *F25J 3/04563* (2013.01); *B01D 53/002* (2013.01); *B01D 2252/2021* (2013.01); *B01D 2256/10* (2013.01); *B01D 2256/12* (2013.01); *B01D 2256/16* (2013.01); *B01D 2256/20* (2013.01); *C01B 2203/0205* (2013.01); *C01B 2203/0415* (2013.01); *C01B 2203/0475* (2013.01); *C01B 2203/0485* (2013.01); *C01B 2203/84* (2013.01); *C10J 2300/165* (2013.01); *F25J 2205/40* (2013.01); *F25J 2210/02* (2013.01); *F25J 2220/40* (2013.01); *F25J 2230/30* (2013.01); *F25J 2230/42* (2013.01); *F25J 2240/12* (2013.01); *F25J 2240/44* (2013.01); *F25J 2260/44* (2013.01)

(58) Field of Classification Search
    USPC .......................................................... 252/373
    See application file for complete search history.

(56) References Cited

FOREIGN PATENT DOCUMENTS

| | | |
|---|---|---|
| EP | 2 292 554 | 3/2011 |
| EP | 2 498 033 | 9/2012 |
| WO | 2004/089499 | 10/2004 |

METHOD AND PLANT FOR GENERATION OF SYNTHESIS GAS

CROSS REFERENCE TO RELATED APPLICATIONS

This application is a § 371 of International PCT Application PCT/EP2017/025339, filed Nov. 20, 2017, which claims the benefit of EP16400058.0, filed Dec. 9, 2016, both of which are herein incorporated by reference in their entireties.

FIELD OF THE INVENTION

The invention relates to a method of generating a synthesis gas which consists mainly of carbon monoxide and hydrogen and has been freed of acid gases, proceeding from a hydrocarbonaceous fuel, and air and steam, wherein low-temperature fractionation separates air into an oxygen stream, a tail gas stream and a nitrogen stream, wherein the tail gas stream and the nitrogen stream are at ambient temperature and the nitrogen stream is at elevated pressure, wherein the hydrocarbonaceous fuel is mixed with the oxygen stream and steam at elevated temperature and elevated pressure and converted to a synthesis gas by a method known to those skilled in the art, and wherein acid gas is subsequently separated therefrom by low-temperature absorption in an absorption column with a liquid absorbent, in which the absorbent is cooled by means of a compression refrigeration plant.

The invention likewise relates to a plant for conducting the method.

BACKGROUND OF THE INVENTION

The methods underlying the invention (cryogenic air fractionation, generation of synthesis gas from a carbonaceous fuel and cryogenic separation of acid gas from the (crude) synthesis gas) form part of the prior art.

Cryogenic air fractionation, also called low-temperature fractionation, has been known since the 1920s and is described in principle, for example, in Ullmann's Encyclopedia of Industrial Chemistry, 6th Edition, vol. 10, p. 39, 40. In connection with synthesis gas production, the known air fractionation methods frequently make use of two-column rectification since this also generates, as well as the oxygen stream, a stream of pure nitrogen which can frequently be used in plants connected downstream of the synthesis gas production. One design of two-column rectification which is frequently used for synthesis gas production is described in the textbook "Gasification", Second Edition, Christopher Higman, Maarten van der Burgt, Gulf Professional Publishing, Else-vier, Burlington, USA.

In this design, the air stream sucked in from the environment is compressed and subjected to a preliminary purification in which moisture and long-chain hydrocarbon molecules are removed in an adsorption step and then carbon dioxide and the remaining hydrocarbons are removed by means of molecular sieve. The air stream thus treated is then made to exchange heat with the product streams (oxygen, nitrogen and tail gas) leaving the two-column rectification.

The heat exchange is conducted until the compressed air is cooled down to its condensation temperature and the product streams are warmed up to ambient temperature. This method is frequently conducted in such a way that the nitrogen product stream, after the exchange of heat and the simultaneous warming to room temperature, has an elevated pressure of about 5-6 bar. This nitrogen can be used as utility for other plants or, for example after expansion and cooling, for preliminary cooling of the air for the air fractionation plant.

The oxygen produced in the air fractionation is subsequently, together with a stream of steam, used for conversion, also called gasification, of a hydrocarbonaceous fuel to give synthesis gas consisting mainly of hydrogen and carbon monoxide. The fuel used is frequently coal, coke or natural gas, but also liquid hydrocarbons or biomass. A multitude of methods and reactor types have been developed for the respective fuels. An overview of these gasification methods is also given, for example, by the abovementioned textbook "Gasification". In principle, all these gasification methods are usable for the present invention.

For the further use of the synthesis gas, as a raw material for the production of methanol, ammonia or hydrogen, for example, or as fuel gas, it is necessary to separate carbon dioxide and hydrogen sulfide, often referred to collectively as acid gases, therefrom. This is very effectively accomplished by a low-temperature absorption method, in which methanol cooled down to a low temperature is used as absorbent. This method has been known by the name "Rectisol process" since the 1950s. A description is given, for example, in Ullmann's Encyclopedia of Industrial Chemistry, 6th edition, vol. 15, p. 399 ff. The acid gases are scrubbed out of the cryogenic methanol here in a column, in countercurrent. In what is called the standard Rectisol process, both acid gases, carbon dioxide and hydrogen sulfide, are scrubbed out in a column. The synthesis gas to be scrubbed enters the column at the base, mainly hydrogen sulfide is scrubbed out in the lower portion of the column and then, in the upper portion, mainly carbon dioxide is scrubbed out. In the regeneration of the methanol, the acid gases are obtained as a gas mixture and removed for further treatment. For the case of intending to obtain carbon dioxide and hydrogen sulfide separately, what is called the selective Rectisol method was developed. In this method, the synthesis gas to be cleaned flows through two scrubbing or absorption columns arranged in succession. Hydrogen sulfide is removed in the first, carbon dioxide in the second. The acid gases are thus kept separate and can then each be driven out of the laden methanol. For the present invention, it is possible to use both the standard and the selective Rectisol methods. The low temperature of the methanol required for the method is estab-lished by withdrawing a laden methanol stream which has been heated by the absorption from the absorption column, cooling it by heat exchange with a cooling medium and then feeding it back into the column. The cooling medium used is frequently ammonia or propylene, which is cooled down correspondingly in a compression cooling plant in each case.

For establishment of the low process temperatures required, the method of the invention for synthesis gas generation requires high expenditure of electrical energy which is needed for the compression of the air and the coolant.

The problem addressed by the invention is therefore that of providing a variant of the method having lower consumption of electrical energy for operation thereof.

SUMMARY OF THE INVENTION

The problem is solved by a method and a plant according to the features of various embodiments described herein.

The nitrogen stream generated in the fractionation of air by means of low-temperature two-column rectification, at about 5-6 bar and ambient temperature, is obtained more or less as a waste stream, and has to date been released into the ambient air. This inevitably means discarding the compression energy present in this stream to zero benefit. The size of this unutilized nitrogen content frequently depends on whether and how much nitrogen can be used on the site of the plant, for example for further processing of the synthesis gas that does not form part of the method.

According to the invention, the compression energy present in this nitrogen stream is utilized to cool the stream down by expansion and performance of volume work to such an extent that it can be used for support or deburdening of the compression cooling plant for cooling of the absorbent for the low-temperature absorption of the acid gas. The absorbent, frequently methanol, can be cooled here by heat exchange between the nitrogen stream and a methanol stream. The majority of the cooling output required for the low-temperature absorption is supplied by the compression refrigeration plant that forms part of the absorption plant. The cooling of the methanol stream can be conducted either in a heat exchanger, by the nitrogen stream and coolant stream of the compression refrigeration plant, or by means of two heat exchangers arranged successively or in parallel, one for the exchange between the nitrogen stream and the methanol stream and one for the exchange between the coolant and the methanol stream. Alternatively, it is possible that heat exchange is conducted between the nitrogen stream and the coolant of the compression refrigeration plant.

A preferred configuration of the invention is characterized in that heat exchange is conducted between the nitrogen stream before it has passed through the expansion turbine and the same stream after it has exchanged heat with the absorbent or with the coolant. Since the heat exchange of the nitrogen with the absorbent or with the coolant is effected at a very low temperature level, the nitrogen stream is subsequently still cold enough for cooling. The cooling energy level of the nitrogen stream is thus utilized to a higher degree.

A further preferred configuration of the invention is characterized in that the nitrogen stream, after it has exchanged heat with the absorbent or the coolant, is passed through and simultaneously cooled further in a further expansion turbine and then used once more for cooling of the absorbent or the coolant. In this way, the heating and hence the volume expansion that the nitrogen stream undergoes on cooling of the absorbent or the coolant is exploited by a further expansion in a further turbine.

A further preferred configuration of the invention is characterized in that the energy obtained in the expansion of the nitrogen stream by means of the expansion turbine is used to drive a compression turbine for compression of the tail gas stream obtained by the fractionation of air and then the tail gas stream is cooled by heat exchange and expansion in a further expansion turbine and then used for cooling by heat exchange with the absorbent or the coolant. In this way, firstly, the tail gas stream which is normally released to the environment is utilized and, secondly, the volume work performed by the nitrogen stream in the expansion turbine is utilized.

A further preferred configuration of the invention is characterized in that the liquid absorbent used is methanol. Methanol has very good absorption capacity for the acid gases. Moreover, its absorption capacity is very temperature-dependent, such that methanol can be regenerated in a simple manner, by heating.

A further preferred configuration of the invention is characterized in that the cooling of the coolant is conducted by heat exchange with the nitrogen stream and, if applicable, according to claim 4, with the tail gas stream by means of a heat exchanger installed directly upstream of the expansion nozzle in the coolant circuit of the compression refrigeration plant. This additional cooling results in a smaller degree of evaporation of the coolant when it passes through the expansion nozzle. The amount of coolant pumped in circulation in the coolant circuit can be reduced in this way.

The invention further relates to a plant for generating synthesis gas, comprising the following component plants:

plant for fractionation of air using an air fractionation plant that works by the principle of cryogenic rectification under elevated pressure, suitable for generating a stream of gaseous oxygen and a stream Sti of gaseous nitrogen at elevated pressure and ambient temperature, and a tail gas stream, plant for conversion or gasification of a carbonaceous fuel with a gasifying agent to give a synthesis gas comprising mainly hydrogen and carbon monoxide, wherein the component plants for air fractionation and gasification are connected such that the oxygen generated in the air fractionation can be added to the gasifying agent used in the gasification, plant for removal of the acid gases carbon dioxide and hydrogen sulfide from the crude synthesis gas generated in the gasification by absorption at low temperature with a liquid absorbent, for example methanol, wherein the plant is equipped with a compression refrigeration plant, wherein the plant comprises an expansion turbine by means of which the nitrogen stream generated in the gasification can be expanded and simultaneously cooled and a heat exchanger for the heat exchange between this expanded nitrogen stream and the liquid absorbent used in the component plant for acid gas removal or with the coolant of the compression refrigeration plant.

A preferred configuration of the plant according to the invention is characterized in that the plant comprises an additional heat exchanger for the heat exchange between the nitrogen stream generated in the component plant for air fractionation before it has been expanded and the same stream after it has been expanded in the expansion turbine and after it has exchanged heat with the liquid absorbent or coolant. This additional heat exchanger enables the exploitation of the cooling energy still present in the nitrogen for preliminary cooling of the nitrogen stream coming from the air fractionation. Since the heat exchange between the expanded nitrogen stream and the absorbent or with the coolant is effected at a very low temperature level, the nitrogen stream is subsequently still cold enough for this preliminary cooling. The cooling energy level of the nitrogen stream can thus be utilized to a higher degree.

A further preferred configuration of the plant according to the invention is characterized in that the plant comprises a second turbine by means of which the nitrogen stream, after it has expanded in the first turbine and exchanged heat in the heat exchanger with the liquid absorbent or the coolant, can be expanded further, and in that the heat exchanger is designed such that simultaneous heat exchange between the liquid absorbent or the coolant therein, the nitrogen stream after it has expanded in the first turbine and the nitrogen stream after it has expanded in the second turbine, is possible. By virtue of this manner of construction of the plant, the heating and hence the volume expansion that the nitrogen stream undergoes on cooling of the absorbent or the coolant can be exploited by a further expansion in the further turbine.

A further preferred configuration of the plant of the invention is characterized in that the plant additionally comprises a compression turbine for compression of the tail gas stream which is driven by the expansion turbine that serves to expand the nitrogen stream, for example in that the compression turbine and the expansion turbine are both mounted on a turbine axis, wherein the plant further comprises a heat exchanger for cooling the compressed tail gas stream with cooling water and an expansion turbine for expansion of the tail gas stream, and wherein the plant further comprises a heat exchanger having two pathways for the tail gas stream and one pathway for the nitrogen stream, and wherein the heat exchanger for the heat exchange between the nitrogen stream and the absorbent or the coolant additionally comprises a pathway for the tail gas stream. The advantage of this configuration is that the volume work performed by the nitrogen stream, when it is expanded via the expansion turbine, can be utilized for the cooling of the absorbent, with utilization of the tail gas stream.

BRIEF DESCRIPTION OF THE DRAWINGS

Developments, advantages and possible uses of the invention are also apparent from the description of non-limiting working and numerical examples and of the drawings which follows. All the features described and/or shown in images, alone or in any combination, form the invention, irrespective of the way in which they are combined in the claims or the dependency references therein.

The figures show.

DETAILED DESCRIPTION OF THE INVENTION

Figure 1:
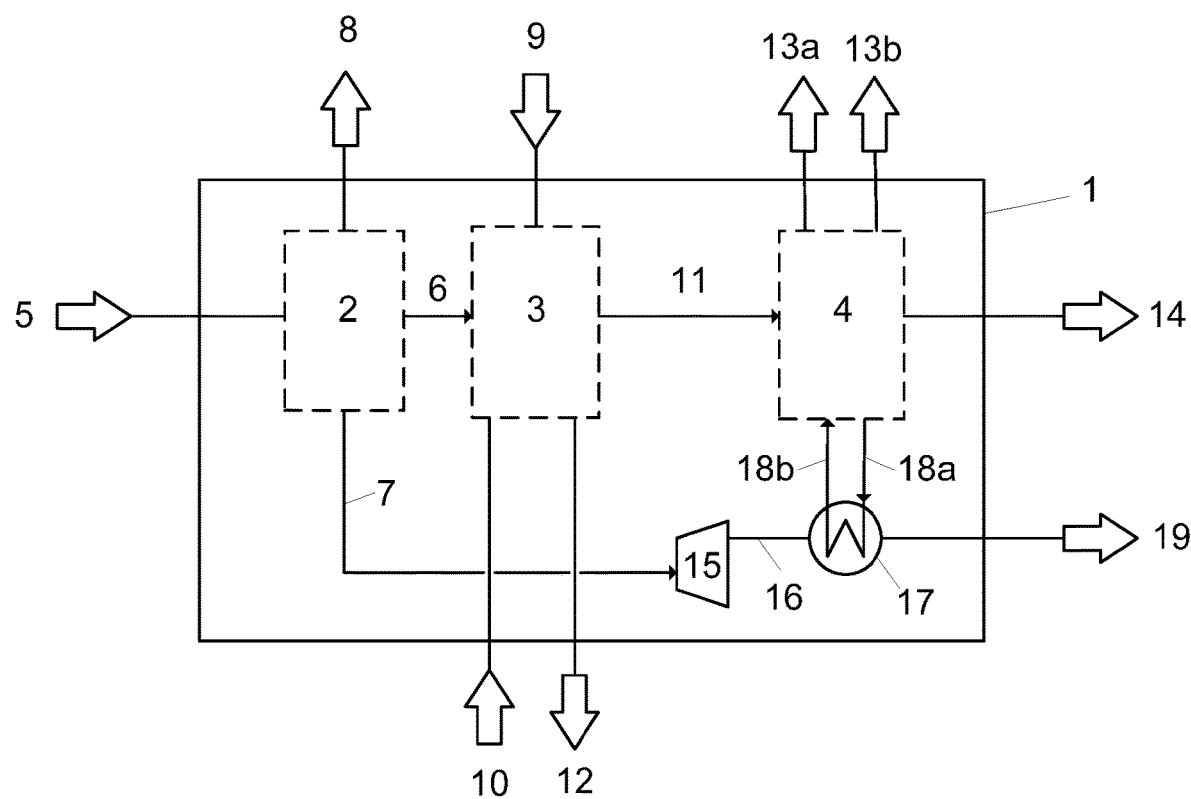
FIG. 1: block diagram of one version of the method of the invention or of the plant of the invention and the heat exchange according to the invention between the expanded nitrogen stream and the absorbent stream.

The invention is to be elucidated hereinafter with reference to the drawing. In FIG. 1, the method according to the invention or the plant 1 according to the invention comprises the method steps or component plants of low-temperature air fractionation 2, hydrocarbon-synthesis gas conversion 3 and low-temperature absorption 4 with compression refrigeration plant. Air 5 is introduced into the low-temperature air fractionation 2, where it is fractionated into the streams oxygen 6, nitrogen 7 and tail gas 8. A useful synthesis gas generation method 3 is any method known to those skilled in the art that generates a synthesis gas from which the acid gas component is to be removed prior to further use outside the method. A hydrocarbonaceous fuel 9, steam 10 and the oxygen 6 are introduced into the method 3, and an acid gas-laden synthesis gas 11 consisting mainly of carbon monoxide and hydrogen and a residue 12 are removed therefrom. Depending on the type of synthesis gas generation method used, the residue 12 may, for example, be ash. The synthesis gas 11 is treated in the method step of low-temperature absorption 4, wherein, in this example, a carbon dioxide stream 13*a* and a carbon dioxide-containing hydrogen sulfide stream 13*b* are separated from the synthesis gas, and the synthesis gas 14 that has been freed of these acid gas streams is discharged from the method 1 for further use. The nitrogen stream 7 leaves the air fractionation 2 at elevated pressure and at ambient temperature. In the expansion turbine 15, the nitrogen stream 7 is converted to a cold nitrogen stream 16. In heat exchanger 17, the absorbent stream 18 from the low-temperature absorption 4 is cooled, the cooling of the absorbent being assisted by the compression cooling plant that is not shown here. Subsequently, the nitrogen stream, as stream 19, is discharged from the method 1 for further treatment. An illustrative model calculation gave the following parameter values:

stream 7: 5.0 bar, 25° C., 25 000 m3 (STP)/h
turbine 15: electrical power generated 1.3 MW
stream 16: 1.7 bar, −55° C.
stream 18 (methanol): −31° C./−35° C.
stream 19: 1.7 bar, −38° C.

Figure 2:
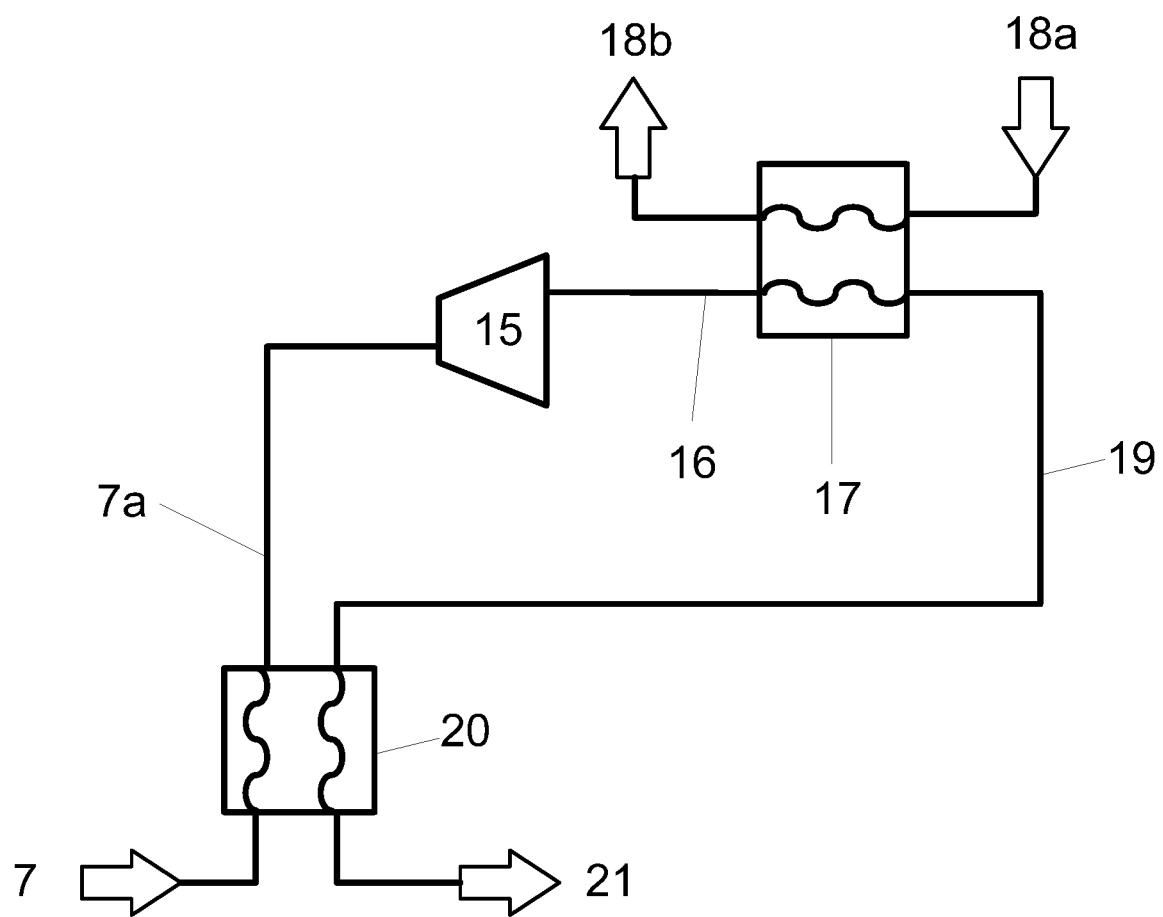
FIG. 2: method diagram of a further version of the heat exchange of the invention between the expanded nitrogen stream and the absorbent stream.

In the configuration of the invention shown in FIG. 2, heat exchange is conducted between the nitrogen stream 7 coming from the air fractionation and the stream 19, i.e. after the exchange of heat of the nitrogen with the absorbent in heat exchanger 20. An illustrative model calculation gave the following parameter values:

stream 7: 5.0 bar, 25° C., 25 000 m3 (STP)/h
stream 7*a*: 4.9 bar, −35° C.
turbine 15: electrical power generated 0.36 MW
stream 16: 3.4 bar, −55° C.
stream 18 a/b (methanol): −31° C./−35° C.
stream 19: 3.3 bar, −38° C.
stream 21: 3.2 bar, 22° C.

Figure 3:
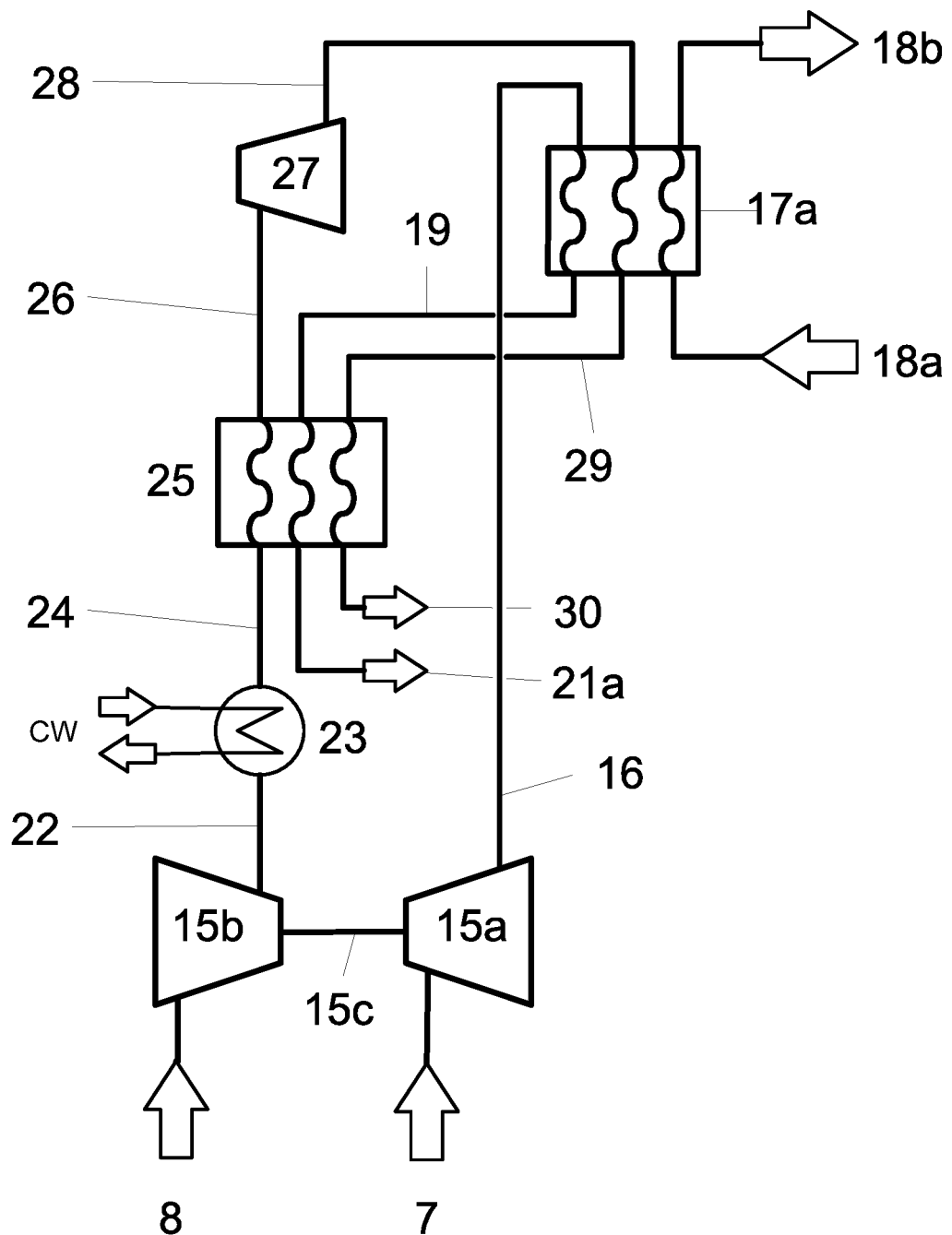
FIG. 3: method diagram of a version of the heat exchange of the invention between the expanded nitrogen stream and the tail gas stream with the absorbent stream.

In the configuration of the invention shown in FIG. 3, the tail gas stream 8 generated in the air fractionation 2, FIG. 1, and the energy generated in the expansion turbine 15 are also used for cooling of the absorbent. For this purpose, in this example, the expansion turbine 15*a* is coupled by means of a shaft 15*c* to the compression turbine 15*b*, i.e. the compression turbine 15*b* is driven directly by the expansion turbine 15*a*. The compression turbine 15*b* compresses the tail gas stream 8 to give stream 22; this is cooled in heat exchanger 23 by means of cooling water CW and then, in heat exchanger 25, by the nitrogen and tail gas streams flowing back from heat exchanger 17*a*. The tail gas stream is cooled further by release of volume work in expansion turbine 27. The tail gas stream 28 is then, together with the nitrogen stream 16, used in heat exchanger 17*a* for cooling of the absorbent stream 18. An illustrative model calculation gave the following parameter values for this configuration:

stream 7: 5.0 bar, 20° C., 25 000 m3 (STP)/h
turbine 15*a*: power generated 1.2 MW
stream 16: 1.5 bar, −55° C.
stream 18 (methanol): −31° C./−35° C.
stream 19: 1.4 bar, −38° C.
stream 21*a*: 1.4 bar, −3.5° C.
stream 8: 1.1 bar, 25° C.
stream 22: 1.8 bar, 70° C.
stream 24: 1.8 bar, 25° C.
stream 26: 1.7 bar, −35° C.
turbine 27: power generated 0.4 MW
stream 28: 1.2 bar, −55° C.
stream 29: 1.1 bar, −38° C.
stream 30: 1.1 bar, −3.5° C.

Figure 4:
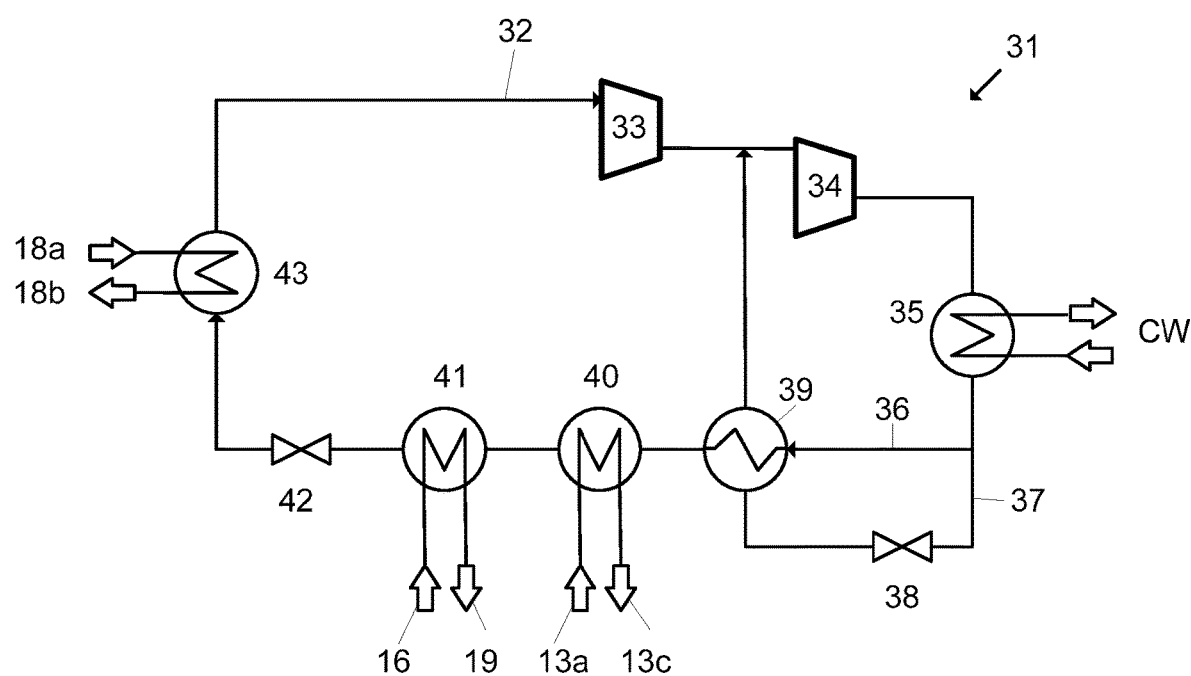
FIG. 4: method diagram of a compression refrigeration plant for cooling of the absorbent stream, with assistance by the expanded nitrogen stream.

FIG. 4 shows, by way of example, the circuit 31 for the coolant of the compression cooling plant which forms part of the low-temperature absorption plant 4, FIG. 1, and serves to cool the absorbent 18*a, b*. The coolant used is frequently ammonia. The ammonia stream 32 is compressed in two stages in the series-connected compressors 33 and 34 and cooled by means of cooling water CW and partly condensed in heat exchanger 35. The ammonia stream is then divided into streams 36 and 37. Stream 37 is expanded in valve 38, simultaneously cooled, and used for cooling of stream 36 in heat exchanger 39 and then recycled back into the main stream upstream of compressor 34. The ammonia stream 36, after being cooled in heat exchanger 39, is cooled in heat exchanger 40 by the carbon dioxide stream 13a removed in the absorption plant 4, FIG. 1, and in heat exchanger 41 by the expanded and cooled nitrogen stream 16. Then the ammonia stream is expanded in valve 42, simultaneously cooled further, and then used in heat exchanger 43 for cooling of the methanol absorbent 18a, b.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

INDUSTRIAL APPLICABILITY

The invention provides a way of lowering the expenditure of electrical energy in the production of synthesis gas and in the cleaning thereof to free it of acid gas. The invention is therefore industrially applicable.

LIST OF REFERENCE NUMERALS 1 method/plant according to the invention
2 low-temperature air fractionation
3 hydrocarbon-synthesis gas conversion
4 low-temperature adsorption
5 air
6 oxygen
7 nitrogen
8 tail gas
9 hydrocarbonaceous fuel
10 steam
11 synthesis gas, comprising acid gases
12 residue
13 acid gases, a and c carbon dioxide, b hydrogen sulfide containing carbon dioxide
14 synthesis gas, free of acid gases
15 turbine, a expansion turbine, b compression turbine, c shaft
16 nitrogen
17 heat exchanger, a heat exchanger for three media
18 absorbent
19 nitrogen
20 heat exchanger
21 nitrogen
22 tail gas
23 heat exchanger
24 tail gas
25 heat exchanger
26 tail gas
27 expansion turbine
28 tail gas
29 tail gas
30 tail gas
31 coolant circuit
32 coolant stream
33 compressor
34 compressor
35 heat exchanger
36 coolant stream
37 coolant stream
38 expansion valve
39 heat exchanger
40 heat exchanger
41 heat exchanger
42 expansion valve
43 heat exchanger

The invention claimed is:

1. A composite plant for generation of synthesis gas, the composite plant comprising the following component plants:
   a. a first component plant configured to fractionate air using an air fractionation plant that works by the principle of cryogenic rectification under elevated pressure, suitable for generating a stream of gaseous oxygen and a stream of gaseous nitrogen at elevated pressure and ambient temperature, and a tail gas stream;
   b. a second component plant configured to convert a carbonaceous fuel with a gasifying agent to give a synthesis gas comprising mainly hydrogen and carbon monoxide, wherein first component plant and second component plant are connected such that the oxygen generated in component plant a) can be added to the gasifying agent used in component plant b),
   c. a third component plant for removal of the acid gases carbon dioxide and hydrogen sulfide from the crude synthesis gas generated in second component plant by absorption at low temperature with a liquid absorbent, wherein the third component plant further comprises a compression refrigeration plant, wherein the composite plant comprises an expansion turbine by means of which the nitrogen stream generated in the first component plant can be expanded and simultaneously cooled, and a heat exchanger for the heat exchange between said expanded nitrogen stream and the liquid absorbent used in the third component plant or with a coolant of the compression refrigeration plant, wherein the composite plant further comprises a second heat exchanger for the heat exchange between the nitrogen stream generated in the first component plant before the nitrogen stream has been expanded and the same stream (19) after it has been expanded in the expansion turbine and after it has exchanged heat (17) with the liquid absorbent or collant.

2. A composite plant for generation of synthesis gas, the composite plant comprising the following component plants:
   a. a first component plant configured to fractionate air using an air fractionation plant that works by the principle of cryogenic rectification under elevated pressure, suitable for generating a stream of gaseous oxygen and a stream of gaseous nitrogen at elevated pressure and ambient temperature, and a tail gas stream:
   b. a second component plant configured to convert a carbonaceous fuel with a gasifying agent to give a synthesis gas comprising mainly hydrogen and carbon monoxide, wherein first component plant and second component plant are connected such that the oxygen generated in component plant a) can be added to the gasifying agent used in component plant b),
   c. a third component plant for removal of the acid gases carbon dioxide and hydrogen sulfide from the crude synthesis gas generated in second component plant by absorption at low temperature with a liquid absorbent, wherein the third component plant further comprises a compression refrigeration plant,
   wherein the composite plant comprises an expansion turbine by means of which the nitrogen stream generated in the first component plant can be expanded and simultaneously cooled, and a heat exchanger for the heat exchange between said expanded nitrogen stream and the liquid absorbent used in the third component plant or with a coolant of the compression refrigeration plant,
   wherein the plant comprises a second turbine by means of which the nitrogen stream, after it has expanded in the first turbine and exchanged heat in the heat exchanger with the liquid absorbent or the coolant, can be expanded further, and in that this heat exchanger is designed such that simultaneous heat exchange between the liquid absorbent or the coolant therein, the nitrogen stream after it has expanded in the first turbine and the nitrogen stream after it has expanded in the second turbine, is possible.

3. A composite plant for generation of synthesis gas, the composite plant comprising the following component plants:
   a. a first component plant configured to fractionate air using an air fractionation plant that works by the principle of cryogenic rectification under elevated pressure, suitable for generating a stream of gaseous oxygen and a stream of gaseous nitrogen at elevated pressure and ambient temperature, and a tail gas stream,
   b. a second component plant configured to convert a carbonaceous fuel with a gasifying agent to give a synthesis gas comprising mainly hydrogen and carbon monoxide, wherein first component plant and second component plant are connected such that the oxygen generated in component plant a) can be added to the gasifying agent used in component plant b),
   c. a third component plant for removal of the acid gases carbon dioxide and hydrogen sulfide from the crude synthesis gas generated in second component plant by absorption at low temperature with a liquid absorbent, wherein the third component plant further comprises a compression refrigeration plant,
   wherein the composite plant comprises an expansion turbine by means of which the nitrogen stream generated in the first component plant can be expanded and simultaneously cooled, and a heat exchanger for the heat exchange between said expanded nitrogen stream and the liquid absorbent used in the third component plant or with a coolant of the compression refrigeration plant,
   wherein the plant additionally comprises a compression turbine for compression of the tail gas stream which is driven by the expansion turbine that serves to expand the nitrogen stream, wherein the plant further comprises a heat exchanger for cooling the compressed tail gas stream with cooling water and an expansion turbine for expansion of the tail gas stream, and wherein the plant further comprises a heat exchanger having two pathways for the tail gas stream and one pathway for the nitrogen stream, and wherein the heat exchanger for the heat exchange between the nitrogen stream and the absorbent or the coolant additionally comprises a pathway for the tail gas stream.

4. The composite plant according to claim 3, wherein the compression turbine and the expansion turbine are both mounted on a turbine axis.

* * * * *